No. 653,976. Patented July 17, 1900.
E. F. VERDEL & F. L. SAINO.
FIREPROOF SHUTTER.
(Application filed July 28, 1899.)
(No Model.)

WITNESSES:
Wm P. Patton
E. M. Hanaford

INVENTORS
E. F. Verdel
F. L. Saino
BY Munn & Co.
ATTORNEYS

UNITED STATES PATENT OFFICE.

EMILE FRANK VERDEL AND FELIX LAWRENCE SAINO, OF MEMPHIS, TENNESSEE.

FIREPROOF SHUTTER.

SPECIFICATION forming part of Letters Patent No. 653,976, dated July 17, 1900.

Application filed July 28, 1899. Serial No. 725,382. (No model.)

*To all whom it may concern:*

Be it known that we, EMILE FRANK VERDEL and FELIX LAWRENCE SAINO, of Memphis, in the county of Shelby and State of Tennessee, have invented a new and Improved Fireproof Shutter, of which the following is a full, clear, and exact description.

This invention is a fireproof shutter of novel construction particularly well adapted for use on buildings that are otherwise measurably fireproof, but also adapted for general application to buildings used for business purposes.

The invention consists in the novel construction and combination of parts, as is hereinafter described and claimed.

Reference is to be had to the accompanying drawings, forming a part of this specification, in which similar characters of reference indicate corresponding parts in all the figures.

Figure 1:
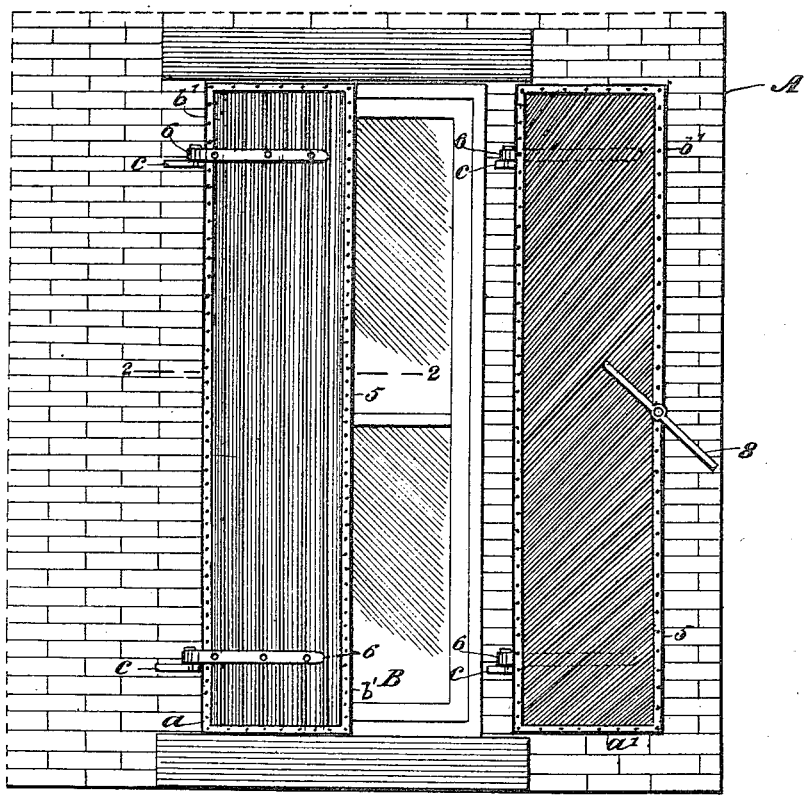
Figure 2:
Figure 3:

Figure 1 is an elevation of a portion of a building and a front view of a window having the improved shutter applied for its protection, one shutter being shown closed and the other one open. Fig. 2 is an enlarged transverse sectional view of one shutter, taken substantially on the line 2 2 in Fig. 1. Fig. 3 is an enlarged fragmentary cross-section of a shutter embodying the improvements, taken through a portion of a hinge therefor, showing the manner of affixing the hinge in place; and Fig. 4 is an inner side view of the improved shutter slightly modified in construction.

In the drawings which illustrate the improvement and its application, A indicates a building-wall and B a window therein. A pair of shutters 5 5 of the improved construction have each a pair of strong strap-hinges 6 secured thereon, suitably spaced apart and preferably affixed transversely upon the exterior side of the shutter.

As shown in Figs. 2 and 3, the duplicate shutters each consists of two plates of sheet metal $a$ $a'$, either of iron or steel, which are rectangular in form, considered edgewise, and have corrugations $b$ of a proper depth and width formed on each plate throughout its area.

Figure 4:
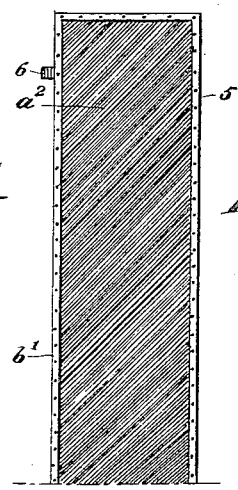

The corrugations on the metal plate $a$, forming the outer surface of the shutter, are preferably extended longitudinally, and those on the opposite plate $a'$, which is innermost when the shutter is closed, may be extended straight across said plate, as shown on the right-hand shutter in Fig. 1, or have a diagonal trend, as represented at $a^2$ in Fig. 4.

Between the inner and outer plates of the shutter a lining of asbestos paper or cardboard 7 is interposed, and this lining extends throughout the area of said plates. It will be seen by reference to Fig. 3 that the lining 7 does not fill the corrugations of the inner and outer plates, and there is thus formed an air-space, or rather a series of air-channels, on each side of the said lining, thereby promoting the fireproof qualities of the shutter. Border-strips $b'$ are preferably secured by rivets along the edges of the shutter at each side of the same, which strips serve to retain the side plates upon the lining and also afford a neat finish for the shutter.

The strap-hinges 6 are each held in place by a plurality of rivets, as clearly indicated in Fig. 3, and also aid in holding the three portions of the shutter secured together, the rivets passing through the rising portions of the corrugations where the same engage the hinge-straps, said hinges having a pivoted engagement with pintles projecting from brackets $c$, secured at proper points on the wall A, so as to support the shutters free to swing thereon and receive adjustment to open and close them.

A keeper-bar 8 is provided for securing the pair of shutters at a window in closed condition, it being pivoted near the center thereof upon the inner surface of one shutter near the side edge, as shown in Fig. 1.

It is claimed for the improved shutter that it is light, neat in appearance, very durable, absolutely fireproof against flame impinging its outer surface, and from its manner of construction all danger of warping, so as to render it unlevel, is obviated, the disposal of the corrugations on the side plates of the shutter so stiffening the same as to avoid twisting of the shutter from climatic changes or exposure to abnormal heat.

Having thus described our invention, we claim as new and desire to secure by Letters Patent—

A metal shutter comprising two spaced corrugated metal plates, the corrugations of one plate being disposed at an angle to those of the other, a fireproof lining located between the plates and in contact therewith at intervals only, so as to leave on each side of the lining, in the corrugations of the plates, air spaces or channels running in different directions, and means for fastening the plates together.

EMILE FRANK VERDEL.
FELIX LAWRENCE SAINO.

Witnesses:
 W. F. SHELTON,
 R. A. MASSEY.